June 24, 1930.  A. RAMSEY  1,767,398
INSULATOR CAP
Filed March 9, 1925
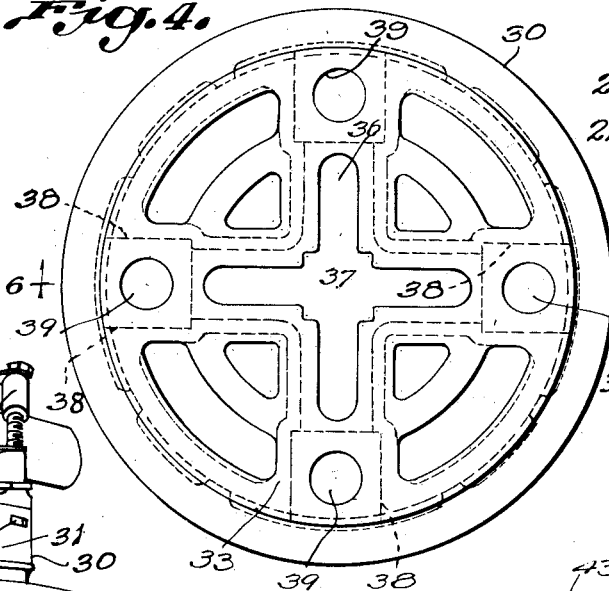
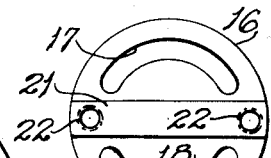
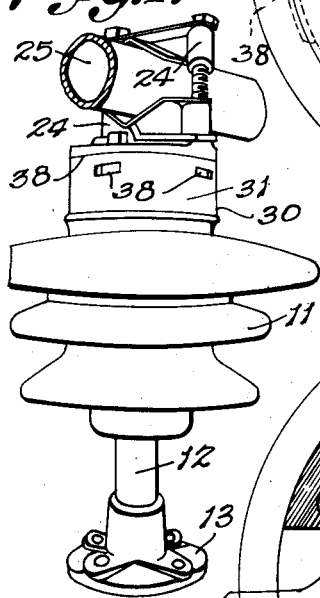
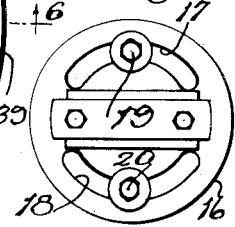
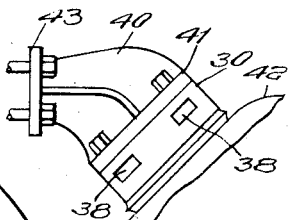
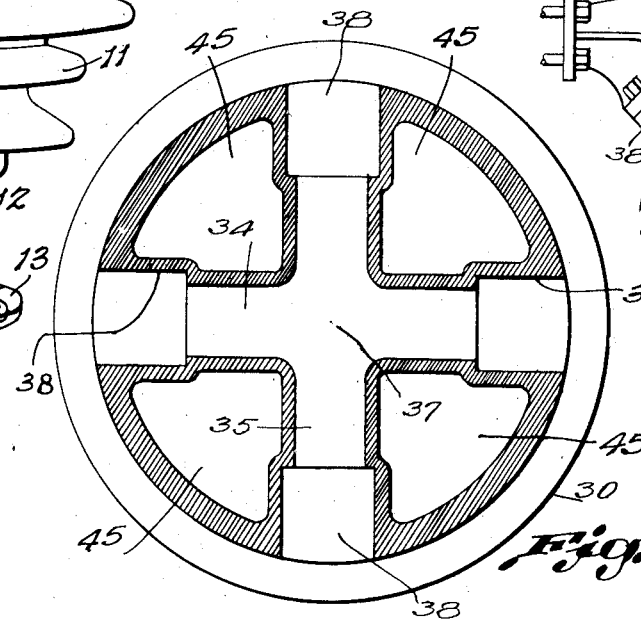
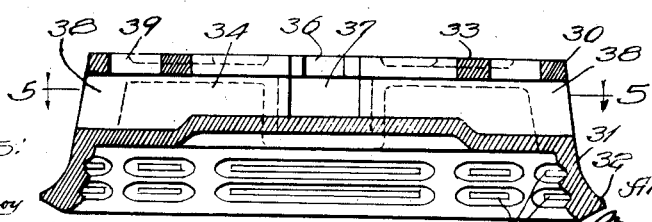

Patented June 24, 1930

1,767,398

UNITED STATES PATENT OFFICE

ALLAN RAMSEY, OF CHICAGO, ILLINOIS, ASSIGNOR TO SCHWEITZER & CONRAD, OF CHICAGO, ILLINOIS, A CORPORATION

INSULATOR CAP

Application filed March 9, 1925. Serial No. 13,965.

My invention relates to insulators and more particularly to caps for the same.

In the generation and distribution of electric current it is necessary to mount many different fittings and pieces of apparatus upon insulators of either the petticoat or the post type. Not only are the fittings and apparatus inherently different, but the relative angular position of the same with respect to the insulator varies.

According to my invention I provide an improved cap suitable for mounting bus bar supports, switches, fuses, choke coils, and the like. The cap member of my invention is, in the preferred form, cemented upon the head of the insulator, although this may be varied by employing a mechanical clamp of any known or preferred type for gripping the head of the insulator. The top of the cap is provided with a series of tunnels, the upper sides of which along the central portion are open to provide a plurality of T slots, preferably crossing at the center, and at their intersection providing an opening through which a bolt head may be inserted. The outer ends of the slots are thereby shrouded or covered over so as to prevent the bolts from moving out of the ends of the slots. A recess is formed as an enlarged part of the outer end of each tunnel for receiving the nut of a larger bolt and a hole extends through the top of the cap into the recess to permit the insertion of a bolt which may be threaded into the nut. By this arrangement of slots or slots and recesses a wide variation of apparatus may be secured upon the cap. The top surface of the cap is made flat and substantially normal to the axis of the insulator, and various forms of flat or angular fittings may be secured thereupon. The surface remote from the slots may be relieved.

Now, in order to acquaint those skilled in the art with the manner of constructing and operating a device embodying my invention, I shall describe in connection with the accompanying drawings a specific embodiment in which my invention may appear.

In the drawings:

Figure 1 is an isometric view of an insulator having a cap of my invention with outdoor bus bar supporting means mounted thereupon;

Fig. 2 is a plan view of the plate which surmounts the cap;

Fig. 3 is a top plan view of the clamping device and plate as the same is mounted upon the cap;

Fig. 4 is a top plan view of the cap;

Fig. 5 is a horizontal section taken on the line 5—5 of Fig. 6;

Fig. 6 is a vertical section taken on the line 6—6 of Fig. 4; and

Fig. 7 is a side elevational view of an angle fitting, such as may be used in connection with the cap of my invention.

In Fig. 1 an outdoor or petticoat type of insulator 11 is mounted upon a suitable post or pin 12 and this post or pin has a suitable mounting base or foot 13, by which the insulator may be mounted in any convenient position upon a suitable base. Upon the top of the insulator 11 there is mounted the cap member 30 which, in the present case, is cemented upon the head or boss of the insulator 11. The outer surface of the head or boss is roughened as by applying coarse grains of sand or small pebbles, or the like, to the surface of the insulator before the same is glazed, so that the cap member 30 may be cemented upon the head as by means of Portland cement, as is well understood by those skilled in the art. The cap member 30 has a depending skirt or flange 31 about the lower edge of the same. Upon its interior, the depending flange 31 has a plurality of cuts or recesses 8 to provide suitable lodging places for the cement in securing the cap 30 upon the insulator 11.

The cap 30 comprises an upper body portion above the skirt or depending flange 31, this body portion having a flat top 33, the flat top lying in a plane substantially normal to the axis of the insulator. The surface of the top may be discontinuous, that is to say, it may be relieved so that the important bearing surfaces may be more readily disc ground, or otherwise brought into substantially a flat planer surface.

The body portion is pierced by two diametrical tunnels 34 and 35 crossing at the center and opened to form two intersecting open T slots 36, which may be considered as four separate radial T slots leading from a common central recess 37 which recess is large enough to admit a bolt head or nuts into the tunnel of the T slots.

The outer ends of the tunnels 34 and 35 are enlarged to form recesses 38 large enough to receive in each case the nut of a 5/8th inch bolt. The tunnels 34 and 35 are large enough to receive the nut or head of a 1/2 inch bolt. As will be apparent to those skilled in the art, the absolute dimensions of these slots is not of the essence of the invention, since the sizes of the bolts may be varied without departing from the same. However, to conform to common practice and for the sake of interchangeability, I have constructed the cap to receive the two sizes of bolts, namely, the 1/2 inch bolt at the central part and the 5/8 inch bolt in the outer ends of the tunnels which outer ends I term recesses. Holes 39 of a size suitable to admit a 5/8 inch bolt extend down thru the top surface and into the recesses 38, so that a nut set in one of the recesses may be engaged by a bolt and the nut will be held from turning as the bolt is tightened up.

It will be noted that the outer ends of the tunnels, namely, the recesses 38, are not only enlarged in width but also in depth as will be apparent from Fig. 6.

Thus the cap is adapted to receive either 1/2 inch bolts along the radial slots, or 5/8 inch bolts as to the outer peripheral recesses. In each event the nut or bolt which enters the recess or slot is held against turning while the co-operating part is tightened up.

In order to lighten the casting there are recesses 45 formed in the idle spaces between the tunnels. I find that the arrangement shown is highly satisfactory and it permits of clamping a wide variety of devices and fittings by means of one, two, three or four bolts. It is particularly adapted for bolts arranged in pairs as two opposed bolts or four bolts arranged at 90° to each other. Referring back to Fig. 1, a clamping plate 16 is mounted upon the cap 30, this plate being shown in Figs. 2 and 3, in plan view, and having two arcuate slots 17 and 18, through which are passed the clamping bolts 19 and 20 arranged at opposite ends of the T-shaped slots 36 in the cap 30. The plate 16 is provided with a seat 21 which has threaded bolt holes 22 at the opposite ends thereof for receiving bolts such as 23, shown in Fig. 1. A pair of trough shaped clamps 24, 24 are held by the bolts 23 against clamping plate 16 and grip between them the hollow bus bar 25.

In Fig. 7 I have shown an angle bracket or fitting 40, the base of which, as shown at 41, is adapted to fit upon the cap 30 mounted on an insulator 42. The outer end or foot 43 of the angle fitting 40 is adapted to be clamped to a fuse, a switch, a clamp, or other mounting, as the case may be. Each of the bases 41 and 43 have four bolts arranged at 90° to each other, the bolts in the base 41 being 5/8 inch bolts and the bolts in the base 43 being 1/2 inch bolts, for example, although it is obvious that this structure may be varied. The intermediate portion of the angle bracket 40 is formed of four webs or ribs all joined at a common center.

By my invention a great variety of mountings and fittings may be mounted upon the top of an insulator in a neat and satisfactory manner. The cap is of unusual strength and the T slots are strengthened by the shrouding at the outer ends. The material is preferably malleable iron and, where desired, the cap is galvanized.

I do not intend to be limited to the details shown or described.

I claim:

1. A cap for insulators comprising a body portion having a flat top surface and depending means for securing the body upon the end of an insulator, a plurality of connected T slots being formed in the body, the outer ends of said slots being covered, the opening below the covered portion being adapted to receive a nut for a clamping bolt, and the covered end of the slot having a bolt opening leading through said nut receiving portion.

2. A cap for insulators comprising a body portion having an upper clamping surface and depending means for securing the body upon the end of an insulator, said body portion having a plurality of rectangular tunnels intersecting at a common central opening and having a portion of each tunnel open to form a T slot, the bore of each tunnel at the outer end being enlarged and a bolt hole being formed down through the top wall of the enlarged bore.

3. A cap for insulators and the like comprising a body portion having a clamping surface at the top, and depending means for securing the body upon an insulator, intersecting tunnels through the body portion, said tunnels having enlarged recesses formed at their outer ends, bolt holes extending down thru the top of the body portion into said recesses and slots in the top adjacent the central part of said intersecting tunnels.

4. A cap for insulators and the like comprising a body portion having depending means for securing the same to an insulator, intersecting diametrical tunnels through the body of the cap, the outer ends of the tunnels being enlarged to form recesses, the parts of the tunnels adjacent the central parts being opened to form T slots, the intersecting portion of the tunnels having a recess for permitting the head of a bolt to be inserted into any one of the slots, the body of the cap being recessed between said intersecting tunnels to lighten the same, and bolt holes extending down through the top of the body portion into the enlarged recesses at the outer ends of the tunnels.

In witness whereof, I hereunto subscribe my name this 6th day of March, 1925.

ALLAN RAMSEY.